United States Patent [19]

Reel et al.

[11] 4,235,598
[45] Nov. 25, 1980

[54] AZO DYESTUFFS CONTAINING A NAPHTHALIC IMIDE COUPLER AND POLYETHER GROUPS

[75] Inventors: Henning Reel, Cologne; Winfried Kruckenberg; Karl H. Schüadehütte, both of Leverkusen, all of Fed. Rep. of Germany

[73] Assignee: Bayer Aktiengesellschaft, Leverkusen, Fed. Rep. of Germany

[21] Appl. No.: 955,360

[22] Filed: Oct. 27, 1978

[30] Foreign Application Priority Data

Oct. 29, 1977 [DE] Fed. Rep. of Germany ....... 2748720

[51] Int. Cl.³ .......................... C09B 29/36; D06P 1/04; D06P 1/18; D06P 3/54
[52] U.S. Cl. ....................................... 8/584; 260/152; 260/155; 8/588; 8/591; 8/662
[58] Field of Search ....................... 260/155, 152; 8/90, 8/89 R, 86, 84, 41 C

[56] References Cited

U.S. PATENT DOCUMENTS

| | | | |
|---|---|---|---|
| 2,961,438 | 11/1960 | Fuchs et al. ......................... | 260/152 |
| 3,462,408 | 8/1969 | Hoffmann et al. ................. | 260/146 R |
| 4,052,378 | 10/1977 | Heckl et al. ......................... | 260/155 |
| 4,057,539 | 11/1977 | Imahori et al. ..................... | 260/155 |

FOREIGN PATENT DOCUMENTS 55-18776   2/1975   Japan ...................................... 260/155

Primary Examiner—Floyd D. Higel

Attorney, Agent, or Firm—Sprung, Felfe, Horn, Lynch & Kramer

[57] ABSTRACT

Valuable dyestuff formulations for dyeing polyester fibres are obtained without expensive finishing techniques by simple mixing of emulsifiers with dyestuffs of the formula

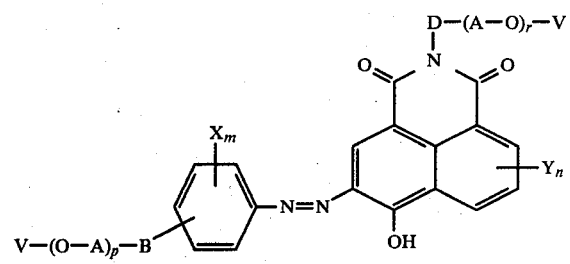

wherein
A=alkylene,
B and D=a direct bond or a bridge member,
V and Q=hydrogen, alkyl, alkenyl, cycloalkyl, aralkyl, aryl or acyl,
X and Y=a non-ionic substituent,
m and n=0 to 3 and
p and r=0 to 10, with the proviso that p represents 3–10 if r=0 or 1 and D=a direct bond.

The dyeing formulations are present in the liquid or dissolved form under the dyeing conditions. The use of dispersing agents, protective colloids, levelling agents and carriers is thus superfluous.

4 Claims, No Drawings

AZO DYESTUFFS CONTAINING A NAPHTHALIC IMIDE COUPLER AND POLYETHER GROUPS

The invention relates to new azo dyestuffs of the formula

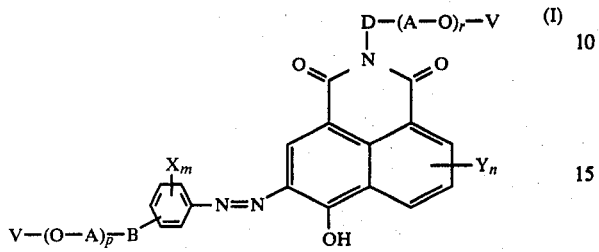

wherein
- A denotes optionally substituted alkylene with 2-4 C atoms in the chain,
- B denotes a direct bond or a bridge member from the group comprising —O—, —S—, —SO—, —SO$_2$—, —CO—, —NQ—, —OOC—, —NQCO—, —NQCOO—, —NQSO$_2$—, —OCONQ—, —COO—, —CONQ—, —SO$_2$NQ—, alkylene or arylene,
- D denotes a direct bond or a bridge member from the group comprising —O—, —NQ—, —N(QCO)—, —N(Q)CO—, —N(QSO$_2$)—, —N(Q)SO$_2$—, alkylene or arylene,
- V and Q denote hydrogen, optionally substituted alkyl, alkenyl, cycloalkyl, aralkyl, aryl or acyl,
- X and Y denote a non-ionic substituent,
- m and n denote the numbers 0 to 3 and
- p and r denote the numbers 0 to 10, with the proviso that p represents the numbers 3–10 if r denotes 0 or 1 and D represents a direct bond, and their preparation and use.

Suitable alkylene radicals A are —(CH$_2$)$_2$—, —(CH$_2$)$_3$—, —(CH$_2$)$_4$—, —C(CH$_3$)H—CH$_2$— or —CH$_2$—C(OH)H—CH$_2$—, —C$_2$H$_4$—and —C$_3$H$_6$— being preferred.

Suitable alkyl radicals V and Q are those with 1–4 C atoms, which can be optionally substituted by —OH, C$_1$—C$_4$—alkoxy, —CN, —Cl, —Br, —COOH or —CONH$_2$.

The allyl radical is preferred as the alkenyl radical.
Suitable cycloalkyl is cyclohexyl.
Suitable aralkyl is benzyl, phenylethyl and phenylpropyl.
Sutiable acyl radicals are C$_1$-C$_4$ -alkylarbonyl radicals or arylcarbonyl radicals.
Suitable aryl is phenyl, which can be monosubstituted to trisubstituted by —CH$_3$, —Cl, —Br, —OCH$_3$, —OC$_2$H$_5$ or —CF$_3$, or substituted by one —NO$_2$.
Suitable arylene is phenylene.
Suitable non-ionic substituents X and Y are, inter alia, C$_1$-C$_4$-alkyl, F, Cl, Br, CF$_3$, NO$_2$, CN and O—C$_1$-C$_4$-alkyl. CH$_3$, Cl, Br, NO$_2$, CN and OCH$_3$ are preferred.

The radical V-(O-A)$_p$-B- is preferably in the ortho-position or para-position relative to the azo group.

Bulky radicals, such as, for example, tert. -butyl, are in those positions where they cause no steric hindrance.

m and n preferably represent 0, 1 or 2. The sum of p and r is preferably 4 to 9.

Preferred dyestuffs according to the invention correspond to the formula

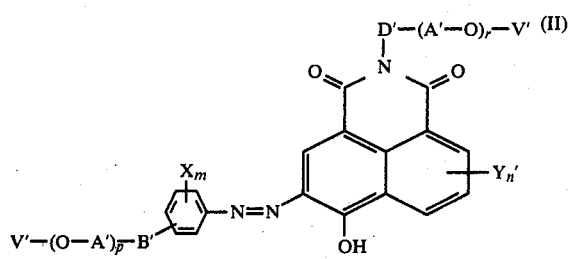

wherein
- A' denotes —C$_2$H$_4$— or —C$_3$H$_6$'3,
- B' denotes a direct bond or —O—, —SO$_2$—, —NQ'—, —OOC—, —NQ'CO—, —OCONQ'—, —NQ'SO$_2$— or alkylene,
- D' denotes a direct bond, —O—, —NQ'—, —N(Q'CO)—, —N(Q'SO$_2$)—, —CH$_2$—, —C$_2$H$_4$— or —C$_3$H$_6$—,
- V' and Q' denote hydrogen, C$_1$-C$_4$-alkyl, hydroxyethyl, cyanoethyl, C$_2$ H$_4$ COOH, methoxyethyl, ethoxyethyl or phenyl,
- X' and Y' denote CH$_3$, Cl, Br, OCH$_3$, CN or NO$_2$ and
- m, n, p and r have the abovementioned meaning.

Dyestuffs of the formula

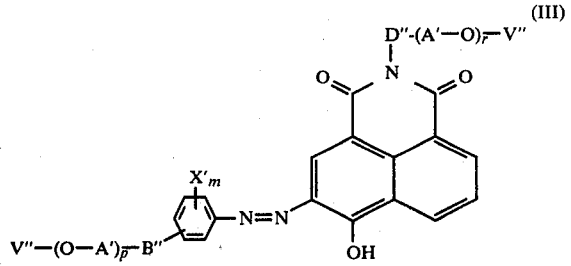

wherein
- B" denotes a direct bond or —0—, —OOC—,—NQ'CO—or —NQ"SO$_2$—,
- D" denotes a direct bond, methylene or — —,
- V'" and Q" denote hydrogen or C$_1$-C$_4$-alkyl and
- A', m, p and r have the abovementioned meaning, are particularly preferred.

Dyestuffs of the formula III wherein
- B" denotes —OOC— or —NQ"CO—,
- m denotes the numbers 0 or 1,
- r denotes the numbers 0 to 4 and
- p denotes the numbers 2 to 9, with the proviso that p represents 4 to 8 if r denotes 0 or 1 and D denotes a direct bond and the sum of p and r is at most 9 and the melting point of this compound is below 160° C., preferably below 140° C., are very particularly preferred.

Of these dyestuffs, the dyestuffs of the formula

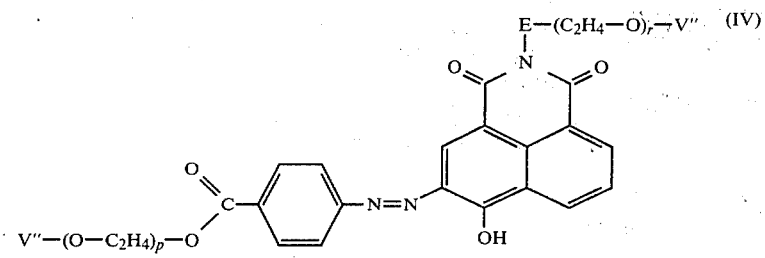

wherein
E denotes a direct bond or —(CH$_2$)— and
V", p and r have the abovementioned meaning, are particularly preferred.

Those dyestuffs of this type in which
r represents 0 or 1 and
p represents 3–8,
are very particularly preferred.

The new dyestuffs are obtained, for example, by a process in which diazotised amines of the formula

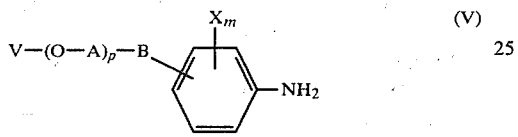

are coupled with 4-hydroxynaphthalimides of the formula

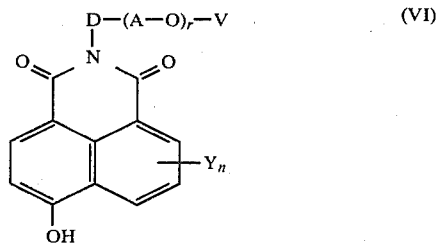

in a manner which is in itself known, the radicals having the abovementioned meaning.

Some of the compounds of the formula (V) are known (compare DOS (German Published Specification) No. 2,414,279, U.S. Pat. No. 3,154,534 and Guernsey Pat. Specification No. 996,068).

However, the compounds of the formula (V) which have not hitherto been described are easily accessible by methods which are in themselves known, for example by reacting compounds of the formula

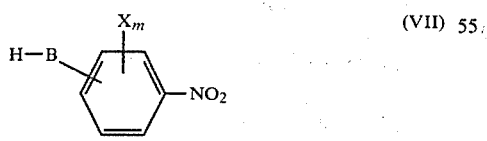

with alkylene oxides or polyalkylene glycols and then reducing the nitro group to the amino group.

Most of the coupling components of the formula (VI) are also described in the literature (compare, for example, British Patent Specification No. 1,384,457, Japanese Pat. No. 28,250/64, Japanese Pat. No. 50/018,776, Japanese Pat. No. 49/57,169, Japanese Pat. No. 49/85,376, Japanese Pat. No. 49/90,327, Japanese Pat. No. 50/34,327, Japanese Pat. No. 50/31,182, Japanese Pat. No. 50/34,326, Japanese Pat. No. 50/18,776 and Japanese Pat. No. 50/89,679).

The new dyestuffs are outstandingly suitable for dyeing and printing synthetic fibre materials, in particular those made of aromatic polyesters and cellulose esters, on which they produce dyeings with good general fastness properties, in particular good fastness to sublimation, washing and light.

It is particularly advantageous to employ the dyestuffs in the form of liquid or pulverulent formulations which contain, in addition to the dyestuff, emulsifying polar/non-polar compounds, and if appropriate formulating agents and extenders (in particular inorganic salts, such as NaCl and Na$_2$SO$_4$).

In general, a molar ratio of dyestuff to emulsifier of 1:0.1 to 1:4 has proved advantageous; a ratio of 1:1 is preferred, an excess of emulsifier generally not being harmful. However, a two-fold excess will generally be completely sufficient in practice.

The preparation of the dyeing formulations is not associated with particular pre-conditions with respect to apparatus. Spray-drying, drum-drying or drying in Venuleth apparatuses are just as suitable as simple drying on a metal sheet, after combining the components in usual kettles, or the combination of adduct formation and drying in the abovementioned apparatuses. It is particularly advantageous to mix the filter presscake, or the oily or pasty dyestuff, as is obtained directly in the preparation, with the emulsifiers and optionally to convert the mixture into the dry pulverulent form in a known manner. In this context it should be stressed that no expensive finely dividing devices, such as pearl mills and vibratory mills, have to be employed for any comminution of the dyestuff/emulsifier mixture, but that coarse grinding down to average particle sizes which are no less than 50μ is completely adequate.

A summary of suitable emulsifiers can be seen from Table 1 in "Tenside Detergents", year 11, 1974, No. 4, page 186.

Preferred polar/non-polar compounds correspond to the general formula

G—L        (VIII)

wherein
G represents an aliphatic hydrocarbon radical with at least 10 C atoms and
L represents —SO$_3$H, —O—SO$_3$H or OPO$_3$H$_2$, or the corresponding salts.

Examples which may be mentioned are: fatty acid soaps, such as sodium laurate, sodium oleate, sodium linoleate, ammonium ricinoleate, the oleic acid ester of sodium isethionate, or sodium palmitate, sodium bis-(2-ethylheyxl)-sulphosuccinate, sodium N-methyl-N-oleyl taurate, β-(tert.-octylphenoxy)-β'-(Na sulphonate)- diethyl ether, sodium isododecylbenzenesulphonate, sodium dodecylsulphate, sodium N-oleylsulphanilate, dodecyl-phosphonic acid, sodium dodecylbenzimidazolesulphanate, alkoxyaryl sulphates, alkylsulphaminoaryl compounds, dodecylphenol sulphate, dodecylbenzenesulphamic acid, dibutylnaphthol sulphate and dioctylnaphthol sulphate. Cationic surface-active agents which may be mentioned are dodecylamine acetate, dodecylbenzyldimethylammonium chloride and (n-heptadecyl-N-aminoethyl)-imidazoline acetate. Non-ionic surface-active agents are polyethylene glycol monododecyl ether, polyethylene glycol mono-(isooctyl)-phenyl ether, polyethylene glycol monooleic acid ester and sorbitol monostearic acid ester polyglycol ether.

The new dying formulations are present in the liquid or dissolved form under dyeing or printing conditions. The use of additional surface-active agents, such as dispersing agents, protective colloids, levelling agents or even of carriers during dyeing and printing is thus superfluous in most cases.

In the examples which follow, "parts" denote parts by weight.

EXAMPLE 1

37.1 parts of p-aminobenzoic acid methyl-pentaglycol ester are dissolved in 60 parts of water and 30 parts of concentrated hydrochloric acid and, after adding 100 parts of ice, are diazotised at 0°–3° C. by adding one equivalent of 30% strength NaNO₂ solution dropwise. A little amidosulphonic acid and 10 parts of Cellite are then added and the mixture is clarified.

22.7 parts of 4-hydroxy-N-methylnaphthalic acid imide are dissolved in 600 parts of water at pH 10 by adding 40% strength sodium hydroxide solution. The solution is cooled to 0°–5° C. by adding 200 parts of ice and the above diazotisation product is allowed to run into this solution. During this addition, the pH value is kept at pH 8–9 by simultaneously adding 40% strength sodium hydroxide solution dropwise. After the coupling reaction has ended, the pH value is adjusted to pH 5 with concentrated hydrochloric acid.

120 parts of NaCl are then added to the pasty suspension and the mixture is heated to 90°–95° C. by passing steam in and filtered hot. About 100 parts of a coarse-particled presscake are thus obtained, which contains 58 parts of pure dyestuff (95% of theory) of the formula (IX):

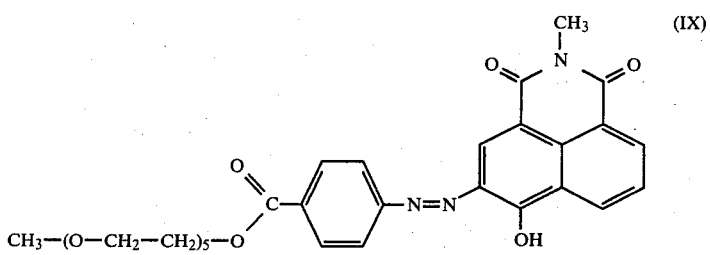

The above presscake is homogenised thoroughly by stirring vigorously together with 58 parts of emulsifier (29 parts of $C_{12}H_{25}$—$OSO_3Na$ and 29 parts of $C_{18}H_{37}$—$OSO_3Na$), 25 parts of $Na_2SO_4$ and 300 parts of water. This suspension is spray-dried. A dark red powder is thus obtained having the composition of about 40% of pure dyestuff, 40% of emulsifier and 20% of $Na_2SO_4/NaCl$, and dyes polyester materials, for example, in luminous red shades of outstanding fastness to washing, sublimation and light by the usual exhaustion process with about 97% exhaustion of the bath, and can also be employed for printing processes with similarly good results.

The p-aminobenzoic acid methyl-pentaglycol ester employed in this Example can be obtained, for example, by reacting methanol (or methylglycol) with 5 (or 4) equivalents of ethylene oxide in a closed vessel under catalysis by an alkali at somewhat elevated temperature, reacting the resulting statistical mixture of methyl-polyglycols, the average molecular weight of which corresponds to that of a methyl-pentaglycol, with one equivalent of p-nitrobenzoic acid chloride to give the corresponding ester and then converting the nitro group into the amino group, for example by catalytic hydrogenation.

EXAMPLE 2

50.3 parts of p-aminobenzoic acid methyl-octaglycol ester (prepared as outlined in Example 1) are diazotised in aqueous-hydrochloric acid solution with NaNO₂ solution and the diazotisation product is coupled with 22.7 parts of 4-hydroxy-N-(β-methoxyethyl)-naphthalic acid imide as described in Example 1. The dyestuff is obtained as a viscous oil (70 parts, 94% of theory), which, after separating off the aqueous mother liquor from the coupling, is made into a paste with 70 parts of the emulsifier $C_{12}H_{25}OSO_3Na$, 30 parts of $Na_2SO_4$ and 300 parts of water and the paste is spray-dried. The powder thus obtained, having the composition of about 40% of pure dyestuff, 40% of emulsifier and 20% of $Na_2SO_4/NaCl$, dyes polyester materials, for example, in luminous red shades with outstanding fastness properties by the exhaustion process at 130° C. with 93% exhaustion of the bath.

Further dyestuffs according to the present invention and the colour shades of the dyeings and prints obtainable with these dyestuffs on polyester materials are given in the table which follows.

The p values and r values are predominantly average values, which are determined for the crude oxyalkylation products from the OH number or the average molecular weight. The p values and r values $\leq 3$ may be "round" numbers, since the corresponding oxyalkylation products can still be easily obtained in the pure form by distillation.

TABLE 1

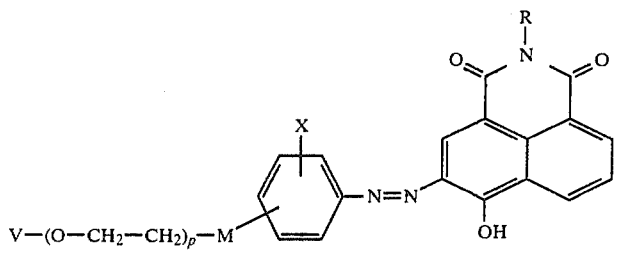

| Example | V | p | M | X | R | Colour Shade |
|---|---|---|---|---|---|---|
| 2 | CH$_3$ | 8 | 4-OCO— | H | CH$_2$—CH$_2$—OCH$_3$ | red |
| 3 | CH$_3$ | 6 | 4-OCO— | H | CH$_3$ | red |
| 4 | CH$_3$ | 5 | 4-OCO— | H | CH$_2$—CH$_2$—OCH$_3$ | red |
| 5 | CH$_3$ | 6 | 4-OCO— | H | CH$_2$—CH$_2$—OCH$_3$ | red |
| 6 | CH$_3$ | 4 | 4-OCO— | H | CH$_2$—CH$_2$—OH | red |
| 7 | CH$_3$ | 4 | 4-OCO— | H | C$_3$H$_6$—(OC$_2$H$_4$)$_2$—OCH$_3$ | red |
| 8 | C$_2$H$_5$ | 5 | 4-OCO— | H | CH$_3$ | red |
| 9 | C$_2$H$_5$ | 5 | 4-OCO— | H | CH$_2$—CH$_2$—OCH$_3$ | red |
| 10 | C$_4$H$_9$ | 5 | 4-OCO— | H | CH$_3$ | red |
| 11 | CH$_3$ | 5 | 4-OCO— | H | C$_2$H$_5$ | red |
| 12 | CH$_3$ | 6 | 4-OCO— | H | C$_3$H$_7$ | red |
| 13 | CH$_3$ | 6 | 4-OCO— | H | C$_2$H$_9$ | red |
| 14 | C$_4$H$_9$ | 3 | 4-OCO— | H | CH$_2$—CH$_2$—OCH$_3$ | red |
| 15 | CH$_3$ | 5 | 2-OCO | 4-NO$_2$ | CH$_2$—CH$_2$—OCH$_3$ | red |
| 16 | H | 0 | — | 4-NO$_2$ | C$_3$H$_6$—(OC$_2$H$_4$)$_4$—OCH$_3$ | red |
| 17 | CH$_3$ | 4 | 4-OCO— | H | OH | red |
| 18 | CH$_3$ | 5 | 4-OCO— | H | OH | red |
| 19 | CH$_3$ | 6 | 4-OCO— | H | OH | red |
| 20 | CH$_3$ | 5 | 4-NHCO— | H | CH$_3$ | red |

We claim:
1. An azo dyestuff having a melting point below 160° and of the formula

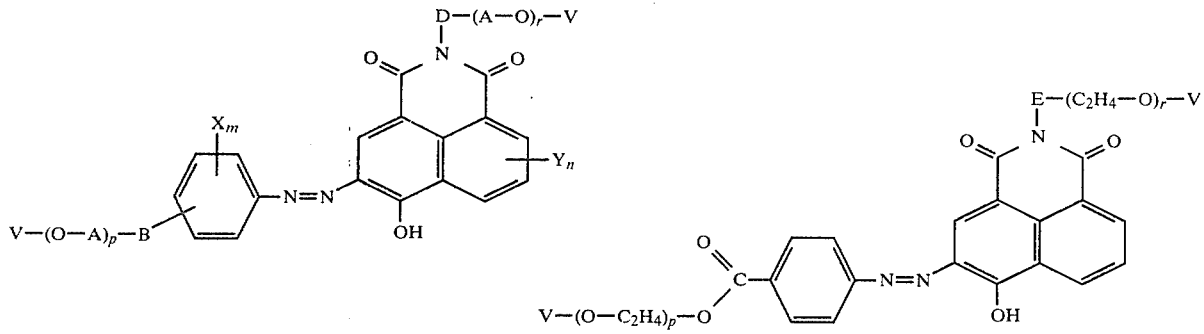

wherein
A is —(CH$_2$)$_2$—, —(CH$_2$)$_3$— or —C(CH$_3$)H—CH$_2$—,
B is —OOC— or NQCO,
D is a direct bond, —CH$_2$— or —O—,
V and Q each independently is hydrogen or C$_{1-4}$-alkyl,
X and Y each independently is —CH$_3$, —Cl, —Br, —OCH$_3$, —CN or —NO$_2$,
m is 0 or 1,
n is an integer from 0 to 3
p is 0 or a positive integer,
r is 2, 3, 4, and
p+r is from 4 to 9.

2. An azo dyestuff according to claim 1, of the formula wherein
E is a direct bond or —CH$_2$—.

3. An azo dyestuff according to claim 1, of the formula

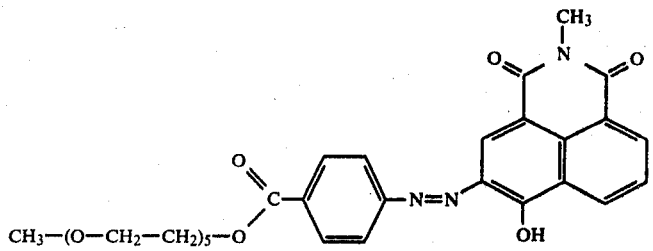
4. A dyestuff formulation comprising a dyestuff according to claim 1 and an emulsifying polar/non-polar compound of the formula
G—L
wherein
G is an aliphatic hydrocarbon radical with at least 10 carbon atoms, and
L is —$SO_3H$, —O—$SO_3H$, —$OPO_3H_2$ or a salt thereof.
* * * * *